Patented Mar. 30, 1926.

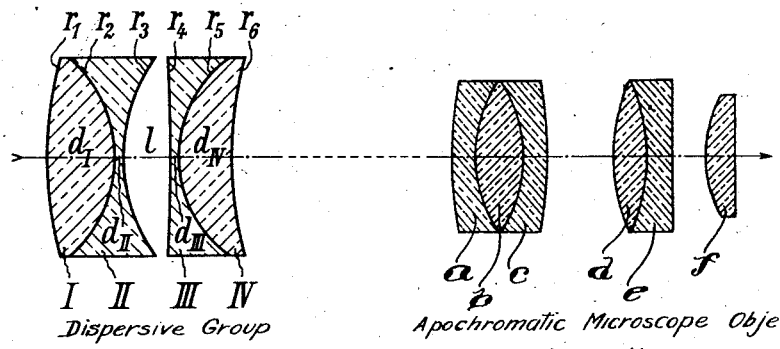

1,578,259

UNITED STATES PATENT OFFICE.

HANS BOEGEHOLD, OF JENA, GERMANY, ASSIGNOR TO THE FIRM OF CARL ZEISS, OF JENA, GERMANY.

GROUP OF LENSES.

Application filed August 8, 1921. Serial No. 490,725.

(GRANTED UNDER THE PROVISIONS OF THE ACT OF MARCH 3, 1921, 41 STAT. L., 1313.)

*To all whom it may concern:*

Be it known that I, HANS BOEGEHOLD, a citizen of the German Empire, residing at Jena, Germany, have invented a new and useful Group of Lenses (for which I have filed an application in Germany, August 31, 1918; Austria, May 29, 1920; England, June 14, 1920, Patent No. 145,023; Italy, June 28, 1920; and France, July 9, 1920, Patent No. 519,981), of which the following is a specification.

The present invention relates to a constituent part of an optical device, which is designed for producing minutely reduced photographs, for instance of writings, with a view to having these photographs of writings dispatched by carrier-pigeons. If, on employing such a device, it be desired to avoid an inconveniently great distance of the object to be taken, it will be found necessary to arrange for a small focal length of the device, but at the same time the aperture must be large, so that the definition of the image is not impaired by way of diffraction. These requirements are best complied with, in case the desired reduction is so great that a device of the type of a photographic objective is out of the question, by a device which is of the type of a compound microscope but is used in such a position, in which that part which corresponds in its construction to the objective of the microscope is turned towards the sensitized film, and that part which corresponds in its construction to the ocular of the microscope faces the object to be taken. If, however, a microscope of the ordinary type is employed, that is to say, one in which the ocular has a collective effect as well, larger objects cannot be imaged satisfactorily because it will generally be found impossible to eliminate in a sufficient degree the astigmatism of oblique pencils and the chromatic difference of the magnification together with the curvature of the image-field. The reason for this is, that, on employing a collective ocular of a microscope, it is not very well possible to impart to the image formed by this ocular such a curvature that a plane image of the said image would just be produced by the objective of the microscope.

According to the invention the last named problem may, however, be solved, if that group of lenses which is to be located towards the object to be taken be so constructed as to be dispersive (which in oculars for microscopes has hitherto already been practised in certain cases), whereby, however, this group should consist of two dispersive members separated from one another, each of which being composed of at least two lenses.

As a matter of course the new group of lenses may also be used in a device acting in the reverse path of the rays, therefore, for producing greatly enlarged photographs, or for projecting under high magnification.

The annexed drawing shows a section through a group of lenses corresponding to the present invention in which each of the two dispersive members consists of two lenses cemented together. A suitable collective system which according to the above explanation would, in addition, have to be disposed behind this group, is shown by dotted lines.

In the following tables the radii of curvature, the lens-thicknesses, the distance apart of the two dispersive members, and the kinds of glass are enumerated.

*Measurements in millimeters.*

$r_1 = + 24,106$    $d_I = 4,5$
$r_2 = -  8,51$     $d_{II} = 0,5$
$r_3 = + 11,29$     $l = 3,0$
$r_4 = -212,831$    $d_{III} = 0,5$
$r_5 = +  7,913$    $d_{IV} = 3,5$
$r_6 = + 24,917$

*Kinds of glass.*

| | $n_D$ | |
|---|---|---|
| I and IV | : 1,57240 | 41,7 |
| II and III | : 1,57088 | 57,5 |

The focal length of this group of lenses amounts to 20,16 mm. Behind this group of lenses an apochromatic microscope-objective having a focal length of 16 mm. and consisting of six lenses $a$, $b$, $c$, $d$, $e$ and $f$ is located, of which the focal point facing this group of lenses has a distance from the focal point of the group of dispersive lenses which faces the said focal point amounting to about 165 mm. The whole arrangement will allow, for instance, to form an image in a plane of a plane object, which is situated 750 mm. away in front of the dispersive group of lenses, reduced six hundred times, without, on an angle of the field of view facing the object and amounting to almost 30° being involved, a disturbing lack of definition becoming evident.

I claim:

An objective system for producing minutely reduced photographs, composed of a group of lenses consisting of two dispersive members separated from one another, each member comprising at least two lenses, of which the one is dispersive while the other is collective, and a collective group, disposed behind the first-named group at a distance from it greater than the focal length of the collective group.

HANS BOEGEHOLD.